United States Patent Office 3,459,489
Patented Aug. 5, 1969

3,459,489
CATIONIC DYESTUFFS, MIXTURES THEREOF AND THEIR USE IN DYEING FIBERS BASED ON ACRYLONITRILE
Robert Frederic Michel Sureau, Enghien-les-Bains, and Marie Josephe Jeanne Alicot, Soisy-sous-Montmorency, France, assignors to Ugine Kuhlmann, Paris, France
No Drawing. Continuation-in-part of application Ser. No. 541,501, Apr. 11, 1966. This application July 5, 1967, Ser. No. 651,158
Claims priority, application France, Apr. 13, 1965, 13,041; Aug. 4, 1966, 72,028
Int. Cl. D06p 3/70
U.S. Cl. 8—25                        11 Claims

ABSTRACT OF THE DISCLOSURE

Cationic dyestuffs of the general formula:

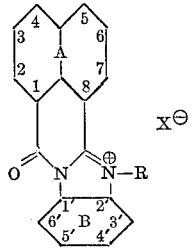

wherein the naphthalene nucleus A may be unsubstituted or substituted by one or two chlorine or bromine atoms, one or two hydroxy groups, or one or two O—Y groups in which Y represents an alkyl, aralkyl or aryl group, the benzene nucleus B may be unsubstituted or substituted by one or more chlorine or bromine atoms or methyl, nitrile, trifluoromethyl or O—Y groups, at least one of the nuclei A and B being substituted, R represents an alkyl or aralkyl group and X represents a monovalent anion.

Also mixtures of such cationic dyestuffs, their use in dyeing and fibres based on polymers or copolymers of acrylonitrile dyed with the dyestuffs or the mixtures thereof.

---

The present application is a continuation-in-part application of our application No. 541,501 of Apr. 11, 1966 (now abandoned) and relates to new cationic dyestuffs, mixtures thereof and their use in dyeing. It concerns particularly naphthoylene-benzimidazolium salts having at last one substituent on the benzene nucleus or the naphthalene nucleus and these salts and mixtures thereof are valuable dyestuffs.

According to the present invention dyestuffs are provided of the general formula:

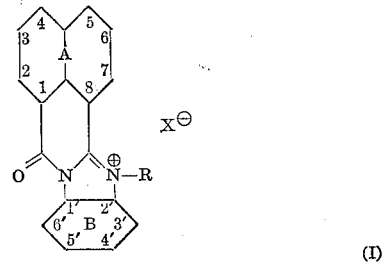
(I)

in which the naphthalene nucleus A may be substituted by one or two chlorine or bromine atoms, one or two hydroxy groups or one or two O—Y groups, Y representing an alkyl, aralkyl or aryl group, preferably methyl or ethyl, the benzene nucleus B may be substituted by one or more chlorine or bromine atoms, or methyl, nitrile, trifluoromethyl or O—Y groups (Y having the same significance as above), at least one of the nuclei A and B being substituted, R represents an alkyl or aralkyl group and X represents a monovalent anion.

The invention includes mixtures of these dyestuffs.

The dyestuffs of the invention are new and they may be obtained, for example, by treatment at a temperature from 100° C. to 180° C. inclusive of naphthoylene-benzimidazole derivatives of the formula:

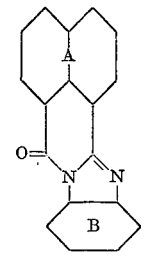
(II)

in which the substituents of A and B are as defined above, with alkylating agents, possibly in the presence of an organic solvent, according to known methods such as described in U.S. Patent No. 2,893,816.

The alkylating agents that may be used include, in particular, the alkyl halides, sulphates and aryl-sulphonates. The organic solvents that may be used especially include alcohols, chloroform, benzene hydrocarbons and their chlorinated derivatives and dimethyl formamide. It may be necessary to work under pressure, for example, when the boiling point of the alkylating agent is lower than 100° C.

The dyestuffs of Formula I are generally very soluble in water, even cold water. In order to separate them it may be advantageous to precipitate them as complex salts, for example by the addition of zinc chloride to their aqueous solutions.

The dyestuffs of Formula II may be prepared in a known manner by the condensation of naphthalic anhydride or its substituted derivatives with o-phenylenediamine or its substituted derivatives. It is also known that in the case substituted derivatives, the dyestuff of Formula II obtained is generally a mixture of isomers. With a view to preparing the dyestuffs of Formula I one can use mixtures of isomers of Formula II and mixtures of isomers of dyestuffs of Formula I are thus obtained. In order to obtain dyestuffs of Formula I which are practically free of isomers, unitary dyestuffs of Formula II can be used, which may be obtained either by separation of a mixture of isomers, for example by fractional crystallisation, or by an unambiguous synthesis such as for example the condensation of naphthalic anhydride with a substituted ortho nitraniline, then reduction of the nitro group and cyclisation, these last two phases being able to be carried out simultaneously.

The dyestuffs of Formula I possess the general properties of cationic dyestuffs and they dye fibres based on polymers or copolymers of acrylonitrile in full-bodied yellow shades endowed with exceptional brilliance and good general fastness. Dyestuffs which are particularly fast to light are those containing an alkoxy group in the 5' position and these may be obtained from a 5-alkoxy-2-nitro-aniline. As compared with the dyestuffs according to the invention, naphthoylene-benzimidazolium salts which are not substituted on one of the nuclei A or B are of no practical interest because their tinctorial power is too small.

In the following examples, which are purely illustrative, to which the invention is not limited, the parts are parts by weight unless the contrary is indicated.

EXAMPLE 1

15 parts of methoxynaphthoylenebenzimidazole (in fact a mixture of the 4'- and 5'-isomers), obtained by condensing 4-methoxy-1,2-phenylenediamine with naphthalic anhydried in acetic medium, are heated for one and a half hours at 110–115° C. in 45 parts of dimethyl sulphate. The solution obtained is allowed to cool to 80° C. and then poured into about 150 parts of water. The mixture is stirred for several hours at 60–80° C. until compelte hydrolysis of the excess methyl sulphate has occurred, 40 parts of sodium chloride are added and then a concentrated solution of zinc chloride in an amount such that the mother liquors are practically decolorised. The product is left to cool, the solid filtered off, washed with a 5% solution of sodium chloride, drained and dried in an oven. 16 parts of a yellow dyestuff are obtained which dyes fibers based on polymers of copolymers of acrylonitrile a vivid and brilliant green-yellow shade endowed with excellent general fastness.

In the following table are grouped a number of examples of dyestuffs according to the invention, which have been prepared in a similar way. Isomers are obtained in admixture.

| Ex. | Substituents of A | Substituents of B | Shade on acrylic fibres |
|---|---|---|---|
| 2 | 3-(or 6-)-hydroxy | 4'-(or 5'-)-methoxy | Green yellow. |
| 3 | 3,6-dihydroxy | do | Do. |
| 4 | 3-(or 6-)-methoxy | do | Do. |
| 5 | 3,6-dimethoxy | do | Yellow. |
| 6 | 3,6-dimethoxy-4-(or 5-)-bromo | do | Golden yellow. |
| 7 | 4-(or 5-)-bromo | do | Do. |
| 8 | 4-(or 5-)-chloro | do | Yellow. |
| 9 | 3-(or 6-)-hydroxy | 4'-(or 5'-)-chloro | Green yellow. |
| 10 | 3,6-dihydroxy | do | Do. |
| 11 | 3-(or 6-)-methoxy | do | Do. |
| 12 | 3,6-dimethoxy | do | Do. |
| 13 | 3,6-dimethoxy-4-(or 5-)-bromo | do | Yellow. |
| 14 | 4-(or 5-)-bromo | do | Green yellow. |
| 15 | 3-(or 6-)-hydroxy | 4'-(or 5'-)-methyl | Do. |

EXAMPLE 16

A mixture of 21 parts of methoxynaphthoylenebenzimidazole (obtained as in Example 1), 150 parts by volume of methanol and 10 parts by volume of methyl iodide is heated at 180° C. for two hours in an autoclave. After cooling, the methoxynaphthoylenemethylbenzimidazolium iodide crystals formed are filtered off and washed with a little methanol. The precipitate is redissolved in the necessary amount of boiling water, a little active charcoal is added, the solution is filtered while hot and the filtrate left to cool. After filtration and drying of the precipitate, 13 parts of a dyestuff having the same tinctorial properties as the dyestuff described in Example 1 are obtained.

EXAMPLE 17

A mixture of 15 parts of methoxynaphthoylenebenzimidazole (obtained as in Example 1) and 12.5 parts of the methyl ether of p-toluene-sulphonic acid is heated at 110–115° C. for one and a half hours. 110 parts by volume of toluene are added, the mixture is left to cool, and the precipitate obtained is filtered off, washed with ether and then dissolved in 150 parts of boiling water. A little active charcoal is added to the solution, the latter is filtered and 25 parts of sodium chloride and a quantity of a concentrated solution of zinc chloride such that the mother liquor is practically decolorised are added to the filtrate. The solid is filtered off, drained and dried in an oven. The dyestuff obtained has tinctorial properties identical with those of the dyestuff described in Example 1.

EXAMPLE 18

A mixture of 100 parts of 2-nitro-5-chloro-aniline, 600 parts by volume of methanol and 36 parts of caustic potash are heated at 120–140° C. for 5 hours. After cooling, the crystalline 2-nitro-5-methoxy-aniline, mixed with potassium chloride, is filtered off, washed with water and dried at 80° C. Dry weight obtained: 67 to 68 parts. Melting point: 127–128° C. When concentrated to a quater of their volume, the mother liquors give up a second fraction which may be recrystallised from methanol. Dry weight obtained: 5 to 6 parts, that is, a total yield of about 75%.

A mixture of 31.2 parts of naphthalic anhydride and 25.2 parts of 2-nitro-5-methoxy-aniline is heated at 240° C. to 250° C. for 4 hours. The molten mass is poured on a plate. After cooling, the solidified product is ground and taken up twice in boiling alcohol, then twice in a dilute solution of sodium carbonate. The solid is filtered off and washed with water. The dried product is recrystallised in about 60 parts of dimethyl formamide, from which 2 - nitro - 5 - methoxy-phenylnaphthoylimide crystallises on cooling. The filtered product is washed with water and dried, and melts at 233° C. (Maquenne block). The dilute filtrate gives up a second fraction rather less pure, M.P. 222–225° C. Total dry weight: 40 parts.

36 parts of this product are introduced in small fractions in a period of about an hour into a mixture of 75 parts of powdered iron, 100 parts of water and 15 parts of acetic acid which had previously been boiled for a few moments and vigorously agitated. The mixture is heated under reflux for about 14 hours. The mass is then neutralised with 15 parts of anhydrous sodium carbonate, and the sludge of iron hydroxide containing the 5'-methoxy-naphthoylenebenzimidazole formed is filtered off, drained and dried. The dyestuff is extracted with chlorobenzene, the chlorobenzene is removed with steam, and the aqueous suspension of the dyestuff is filtered. The dyestuff is in the form of a yellow powder melting at 210° C. to 212° C. Dry weight obtained: 23 parts.

These 23 parts are dissolved in 310 parts by volume of dry chlorobenzene. The solution is heated under gentle reflux and 17 parts by volume of methyl sulphate diluted with an equal volume of chlorobenzene are introduced in a period of one hour. Heating under reflux is continued for an hour, and the product is allowed to cool and the precipitate of 5'-methoxy-naphthoylene-benzimidazolium methyl sulphate formed is filtered off, washed with chlorobenzene, drained and dried. Dry weight obtained: 30 to 31 parts of a dyestuff which dyes fibres based on polyacrylonitrile in green yellow shades of great brilliance and having excellent fastness, especially to light.

EXAMPLE 19

On replacing the 2-nitro-5-methoxy-aniline used in the condensation with naphthalic anhydride in Example 18, with 27.3 parts of 2-nitro-5-ethoxy-aniline, and completing the operation under similar conditions, 5-ethoxy-naphthoylenebenzimidazolium methyl sulphate is finally obtained, the tinctorial properties of which are very close to those of the dyestuff of Example 18.

EXAMPLE 20

A mixture of 10 parts of naphthalic anhydride, 11 parts of 4-methoxy-1,2-phenylenediamine sulphate (titrating 66% of free diamine) and 6 parts of anhydrous sodium acetate is boiled for 4 hours under reflux.

The product is allowed to cool and to stand for several hours, then the precipitate is filtered off, washed with alcohol and then with water until the sulphate ions are eliminated. After drying, 13.5 parts of an isomeric mixture of 4'-methoxy- and 5'-methoxy-naphthoylene-benzimidazole melting at 166–168° C. are obtained.

After three recrystallisations from glacial acetic acid at the rate of 1 part of dyestuff to 10 parts of acetic acid, 4'-methoxy-naphthoylenebenzimidazole is finally obtained in the pure state melting at 194° C.

On treating this dyestuff with methyl sulphate under the same conditions as in Example 18, 4'-methoxy-naphthoylenebenzimidazolium methyl sulphate is finally obtained, which dyes polyacrylic fibres in green yellow shades of great brilliance.

We claim:

1. Dyestuffs and mixtures of dyestuffs of the general formula:

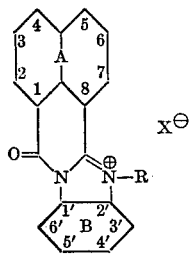

wherein the naphthalene nucleus A may be unsubstituted or substituted by one or two chlorine or bromine atoms, or one or two hydroxy or O—Y groups in which Y represents an alkyl, aralkyl or aryl group, the benzene nuccleus B may be unsubstituted or substituted by one or more chlorine or bromine atoms or methyl, nitrile, trifluoromethyl or O—Y groups, at least one of the nuclei A and B being substituted, R represents an alkyl or aralkyl group and X represents a monovalent anion.

2. Dyestuffs and mixtures of dyestuffs as claimed in claim 1 wherein Y represents a methyl or ethyl group.

3. 5'-methoxy- and 5'-ethoxy-naphthoylene-benzimidazolium salts.

4. 4'-methoxy-naphthoylenebenzimidazolium salts.

5. N⊕-methyl-5'-methoxy naphthoylene-benzimidazolium methylsulphate.

6. Mixtures of N⊕-methyl naphthoylene-benzimidazolium salts as claimed in claim 1 in which the quaternised dyestuffs are the condensation products of 4-methoxy-1,2-phenylenediamine with the anhydride of 3,6-dihydroxy-naphthalene-1,8-dicarboxylic acid.

7. Mixtures of N⊕-methyl naphthoylene-benzimidazolium salts as claimed in claim 1 in which the quaternised dyestuffs are the condensation products of 4-methoxy-1,2-phenylenediamine with the anhydride of 3-methoxy-naphthalene-1,8-dicarboxylic acid.

8. Mixtures of N⊕-methyl naphthoylene-benzimidazolium salts as claimed in claim 1 in which the quaternised dyestuffs are the condensation products of 4-methoxy-1,2-phenylenediamine with the anhydride of 3,6-dimethoxy-naphthalene-1,8-dicarboxylic acid.

9. Mixtures of N⊕-methyl naphthoylene-benzimidazolium salts as claimed in claim 1 in which the quaternised dyestuffs are the condensation products of 4-methoxy-1,2-phenylenediamine with the anhydride of naphthalene-1,8-dicarboxylic acid.

10. Mixtures of N⊕-methyl naphthoylene-benzimidazolium salts as claimed in claim 1 in which the quaternised dyestuffs are the condensation products of 4-chloro-1,2-phenylenediamine with the anhydride of 3,6-dimethoxy-naphthalene-1,8-dicarboxylic acid.

11. Fibres based on polymers or copolymers of acrylonitrile dyed with a dyestuff or mixture of dyestuffs as claimed in claim 1.

References Cited

UNITED STATES PATENTS

| | | | |
|---|---|---|---|
| 2,994,697 | 8/1961 | Eckert et al. | 260—282 |
| 3,103,403 | 9/1963 | Eaton et al. | 8—55 |

FOREIGN PATENTS 1,251,445  12/1960  France.

NORMAN G. TORCHIN, Primary Examiner

T. J. HERBERT, Jr., Assistant Examiner

U.S. Cl. X.R.

8—55; 260—282